(12) United States Patent
Guim Bernat et al.

(10) Patent No.: US 12,160,368 B2
(45) Date of Patent: Dec. 3, 2024

(54) INTELLIGENT RESOURCE SELECTION FOR RECEIVED CONTENT

(71) Applicant: Intel Corporation, Santa Clara, CA (US)

(72) Inventors: Francesc Guim Bernat, Barcelona (ES); Patrick Connor, Beaverton, OR (US); Patrick G. Kutch, Tigard, OR (US); John J. Browne, Limerick (IE); Alexander Bachmutsky, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 920 days.

(21) Appl. No.: 16/859,792

(22) Filed: Apr. 27, 2020

(65) Prior Publication Data

US 2020/0259763 A1 Aug. 13, 2020

(51) Int. Cl.
| | |
|---|---|
| *H04L 47/78* | (2022.01) |
| *H04L 41/08* | (2022.01) |
| *H04L 41/0816* | (2022.01) |
| *H04L 43/0852* | (2022.01) |
| *H04L 43/0888* | (2022.01) |
| *H04L 47/72* | (2022.01) |

(52) U.S. Cl.
CPC ........ *H04L 47/781* (2013.01); *H04L 41/0816* (2013.01); *H04L 41/0886* (2013.01); *H04L 43/0852* (2013.01); *H04L 43/0888* (2013.01); *H04L 47/72* (2013.01)

(58) Field of Classification Search
CPC .............. H04L 47/781; H04L 41/0816; H04L 41/0886; H04L 43/0852; H04L 43/0888; H04L 47/72
See application file for complete search history.

(56) References Cited

U.S. PATENT DOCUMENTS

| | | | |
|---|---|---|---|
| 10,372,362 B2 | 8/2019 | Bernat et al. | |
| 2015/0033002 A1* | 1/2015 | Cordero | G06F 9/45558 713/1 |
| 2018/0285009 A1* | 10/2018 | Guim Bernat | G06F 9/5061 |

OTHER PUBLICATIONS

"Swordfish Scalable Storage Management API Specification", Version 1.1.0a, Technical Position, Swordfish SNIA, last updated Nov. 12, 2019, 149 pages.

(Continued)

*Primary Examiner* — Suraj M Joshi
(74) *Attorney, Agent, or Firm* — Compass IP Law PC

(57) ABSTRACT

Examples described herein relate to a device configured to allocate memory resources for packets received by the network interface based on received configuration settings. In some examples, the device is a network interface. Received configuration settings can include one or more of: latency, memory bandwidth, timing of when the content is expected to be accessed, or encryption parameters. In some examples, memory resources include one or more of: a cache, a volatile memory device, a storage device, or persistent memory. In some examples, based on a configuration settings not being available, the network interface is to perform one or more of: dropping a received packet, store the received packet in a buffer that does not meet the configuration settings, or indicate an error. In some examples, configuration settings are conditional where the settings are applied if one or more conditions is met.

17 Claims, 14 Drawing Sheets

(56) References Cited

OTHER PUBLICATIONS

Brockners, Frank, "Next-gen Network Telemetry is Within Your Packets: In-band OAM", Cisco, Jun. 28, 2017, 51 pages.
Brockners, Frank, et. al., "In-Band OAM", Cisco, IETF 96—OPSWG; Jul. 19, 2016, 17 pages.
DMTF, "Redfish Technical Overview", DMTF, Redfish, www.dmtf.org, Dec. 2017, 42 pages.
Intel, "Intel® Data Direct I/O Technology (Intel® DDIO): A Primer", Technical Brief, Revision 1.0, Feb. 2012, 11 pages.
Ma, Liangping, "5G Technologies, Standards and Commercialization", InterDigital, Aug. 1, 2018, 55 pages.
Recio, R., et. al., "A Remote Direct Memory Access Protocol Specification", Network Working Group, Oct. 2007, 71 pages.

\* cited by examiner

INTELLIGENT RESOURCE SELECTION FOR RECEIVED CONTENT

Cloud computing provides a client device with tremendous computing and storage resources of remote computers. The client can make use of a remote computer or cluster of computers to perform a variety of processing or computing operations as well as remote data processing and data storage or retrieval. For example, a client can be a smart phone, Internet-of-Things (IoT) compatible device such as a smart home, building appliance (e.g., refrigerator, light, camera, or lock), wearable device (e.g., health monitor, smart watch, smart glasses), connected vehicle (e.g., self-driving car), and smart city (e.g., traffic sensor, parking sensor, energy use sensor). Remote computers or clusters of computers can include a data center that is connected to the client using a high-speed networking connection. However, transferring data from the client to a remote computer can incur an unacceptable latency for time-sensitive applications that have strict requirements for promptly receiving results from the remote computer. For example, low latency requirements may arise from rapid but highly informed decisions needed by autonomous driving vehicles, smart homes, image recognition technologies, voice interface technologies, video surveillance for threat detection, cybersecurity, cloud services for mobile devices, industrial machines, or health monitoring system uses and health service delivery systems.

Edge computing is an emerging paradigm where computers, such as a data center of computing resources, are located physically closer to network access points that are in communication with the client devices. For example, an edge computing data center can be physically close or within the same physical room or building as a communication base stations or network connections in communication with client devices. The communication base stations or network connections can route requests for data processing or data transmission to the edge computing system.

DETAILED DESCRIPTION

Figure 1:
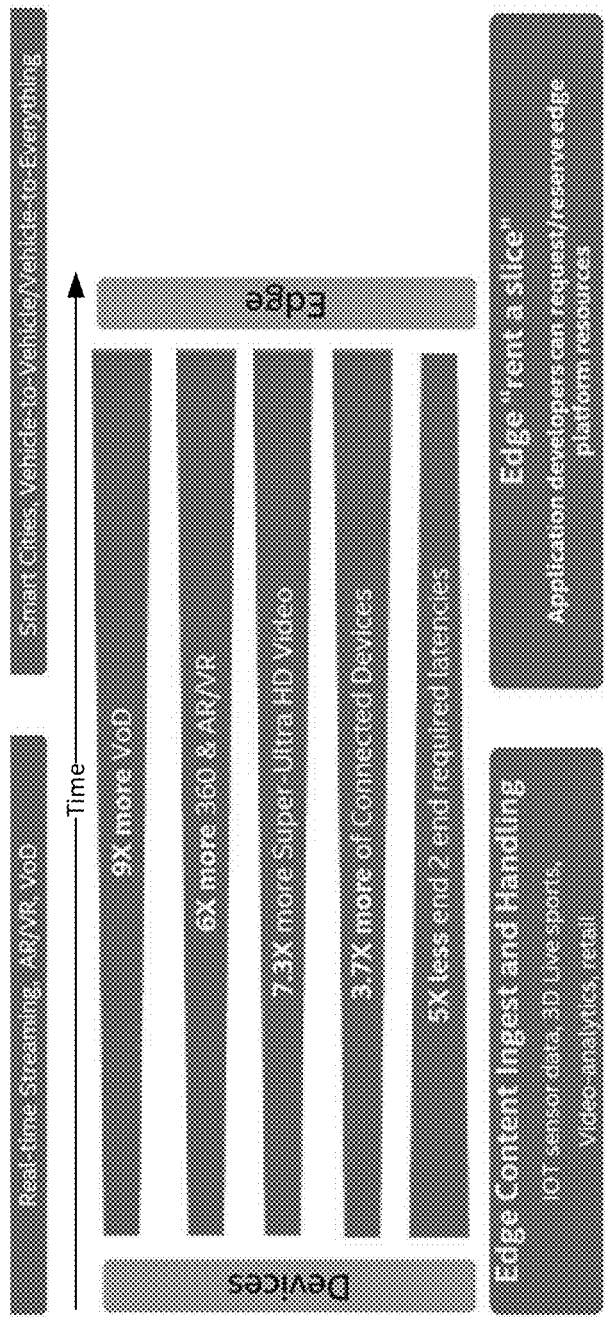
FIG. 1 depicts an example of data growth from a variety of uses.

The volume of data produced by edge systems (e.g., IoT, content delivery, surveillance and so forth) is rapidly increasing. By situating compute at the central offices or base station itself, edge computing can process data with low-enough latency. FIG. 1 depicts that content delivery has grown and is expected to grow substantially and also evolve with diverse types of contents at least for edge computing storage ("Edge") and content delivery networks (CDNs). For example, an increase in number of network connected devices is expected to increase. Various types of content are expected to increase in traffic volume, including at least: video on demand (VoD), 360-degree images and augmented reality (AR) or virtual reality (VR), live broadcast video delivery at 8K resolution (and higher) using Society of Motion Picture and Television Engineers (SMPTE) standards, and super-ultra high definition (HD) video. As the volume of data increases, pressure on memory and storage devices that store or retrieve data can lead to increased latency in processing data.

Figure 2:
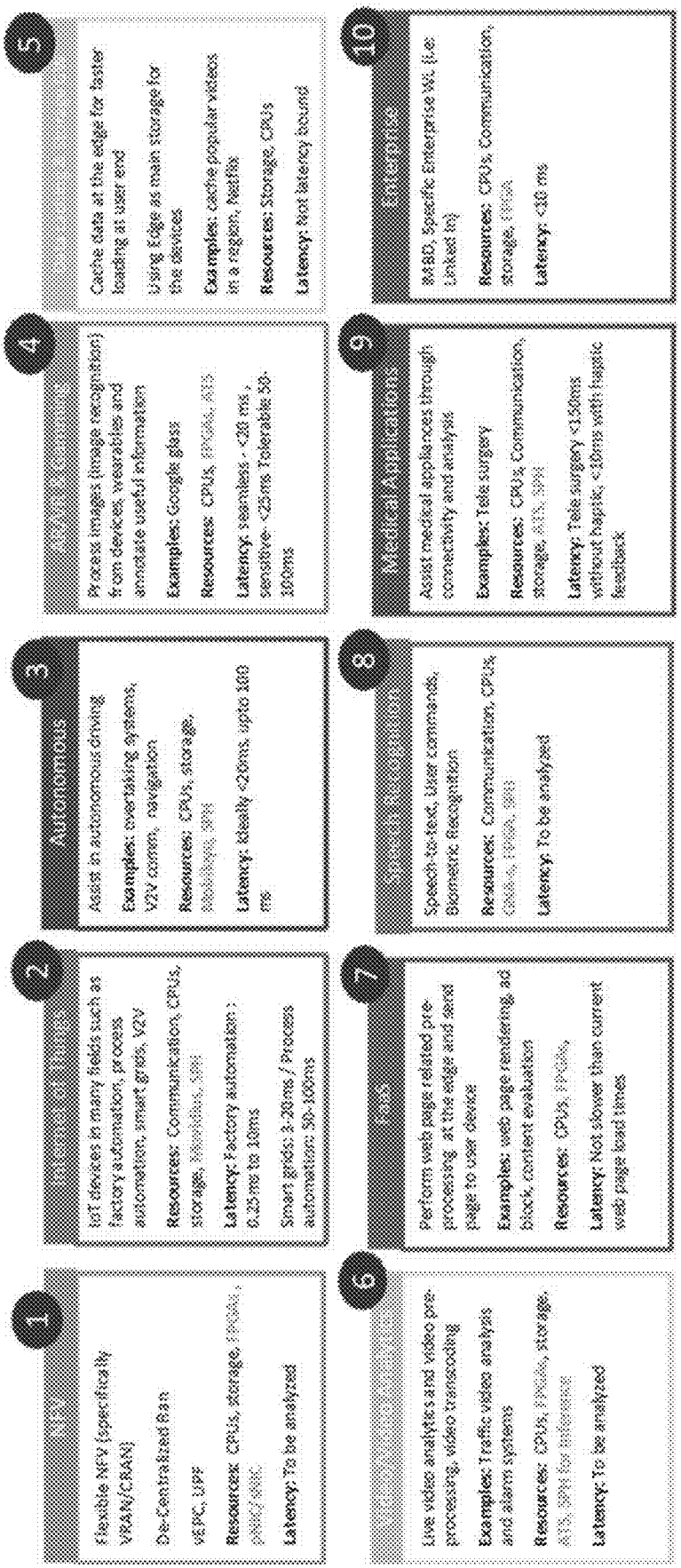
FIG. 2 depicts an example of a variety of use cases showing examples of latency-sensitivity for data.

FIG. 2 depicts an example of a variety of use cases showing examples of latency-sensitivity for data and computing resources. In general, some data have parameters concerning when data to be accessed and processed by a particular service on the edge or by a computing environment (e.g., real-time, can be processed in a second, or can be processed in 10 minutes etc.). Several of these real-time applications using an edge computing platform such as self-driving cars, emergency alert systems, fraud detection systems, and real-time geo-spatial advertising may require data to be processed and responded to as fast as possible. However, other types of data such as sensor data from the road or images to do video analytics can be processed many seconds later after being stored.

Edge computing platform deployments can be shared by multiple tenants whereby multiple different customers can share use of a computing platform. Hence, different types of services may have different levels of service level objectives (e.g., service level agreements (SLA)) depending on the tenant. For instance, surveillance data coming from Tenant A may be processed within 5 milliseconds of receipt whereas data from Tenant B may be processed within 2 seconds of receipt. Different users sending data to a particular service or different services may have different levels of latency or bandwidth parameters. For instance, user A accessing a CDN may have an SLA to store data within 1 ms of receipt and use a memory write bandwidth of 2 Gbps whereas tenant B may have an SLA to store data within 2 ms of receipt and use a memory write bandwidth of 1 Gbps.

Figure 3:
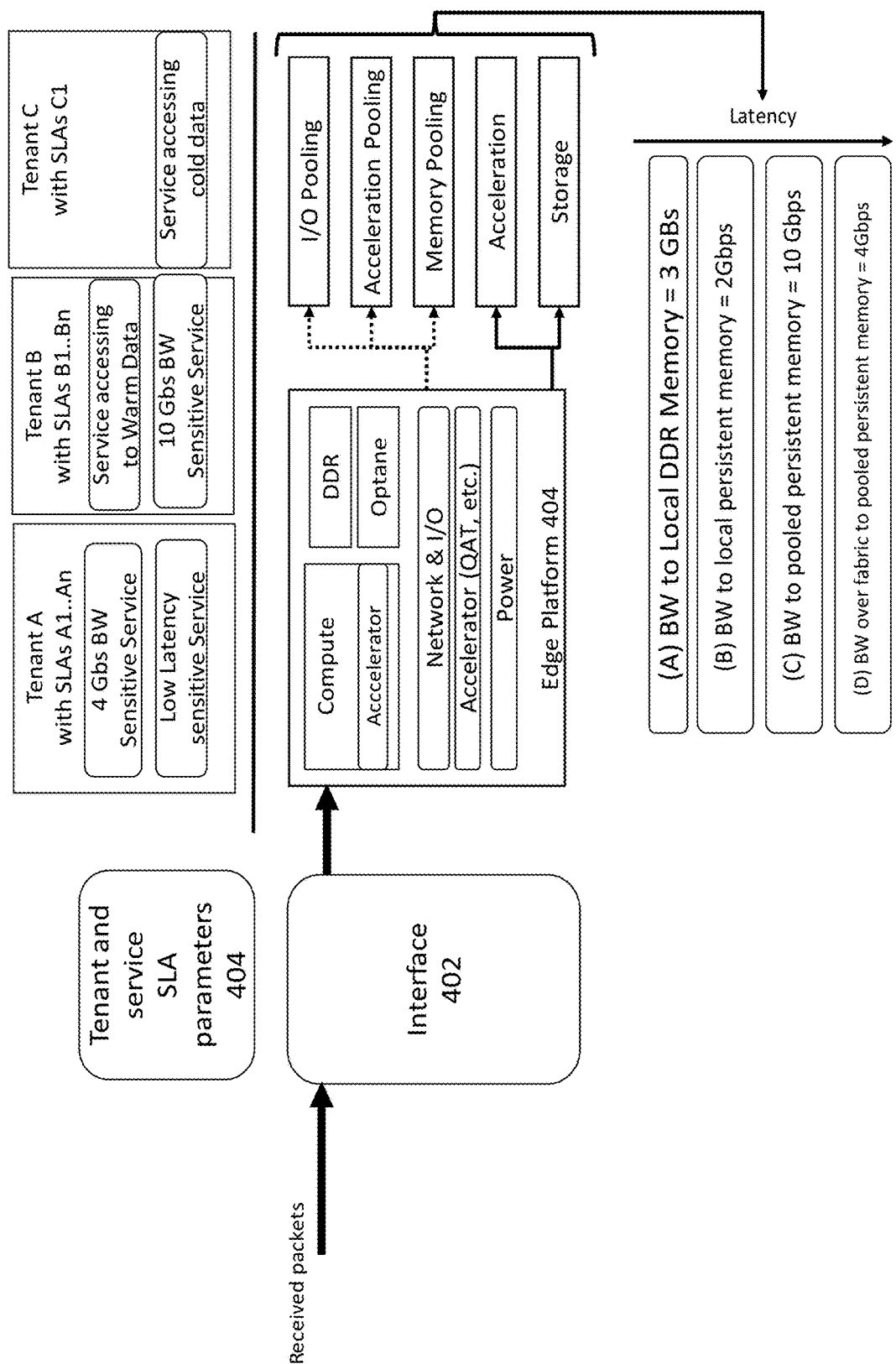
FIG. 3 depicts an example of allocation of data to memory.

FIG. 3 depicts an example of allocation of data to memory. In some examples, traffic received by NIC 302 is stored to main memory or a cache of platform 304. In some examples, a software stack executed by a CPU implements memory and data placement policies to the proper memory tiers (e.g., cache, Double Data Rate (DDR), High Bandwidth Memory (HBM), pooled memory etc.). Non-Ethernet based communications can be used to communicatively couple resources (e.g., CPU, cache, memory, storage, persistent memory, accelerators) such as host fabric interconnects. CPU resources used for such software stacks could instead be used by edge services for data management and potentially reduce revenue as those compute elements could be used for other tasks. Use of valuable CPU resources can increase the total cost of ownership (TCO).

Some NIC implementations provide affinity of received packet flows to certain memory hierarchies. For example, some techniques (e.g., Intel DDIO) makes the processor cache the primary destination and source of data rather than main memory. In some cases, data received at the edge is placed in memories tiers irrespective of latency sensitivity, applicable SLAs, latency, or memory bandwidth.

In some examples (e.g., cellular communications), high priority or low latency data processing can be accomplished by opening a particular connection type. In some implementations, applications can also use different Access Point Names (APNs) to differentiate quality of service. However, in some cases a connection from a device to a particular service may tunnel different types of data and the different types of data have different types of storage requirements but storage requirements may not be differentiated as data can be stored in the same memory tiers. In addition, a load on a memory tier within the platform may render the memory tier not acceptable to meet the SLA associated with a particular tenant or service.

Various embodiments provide a device that is configurable to identify at least latency or memory bandwidth for received data and to select a memory device or a memory tier in which to store data to attempt to meet at least latency or memory bandwidth parameters. For example, the device can be configured to map received data to a tenant or service and select a memory device or memory tier based on latency and bandwidth requirements for the received data. The network interface can be configured with other considerations to select a memory device or memory tier such as TCO or other SLA requirements. For example, a memory device can be associated with a bandwidth, latency, and TCO. Likewise, a memory tier can be associated with a bandwidth, latency, and TCO. For example, latency can be a time between when gather data and generate processed result. For example, bandwidth can be a rate (e.g., bits per second) a data processor can access from memory per second and represent either read or write bandwidth. Other parameters can be considered in selecting a memory device such as timing of when the data is expected to be consumed (e.g., data temperature) or encryption parameters.

Figure 4:
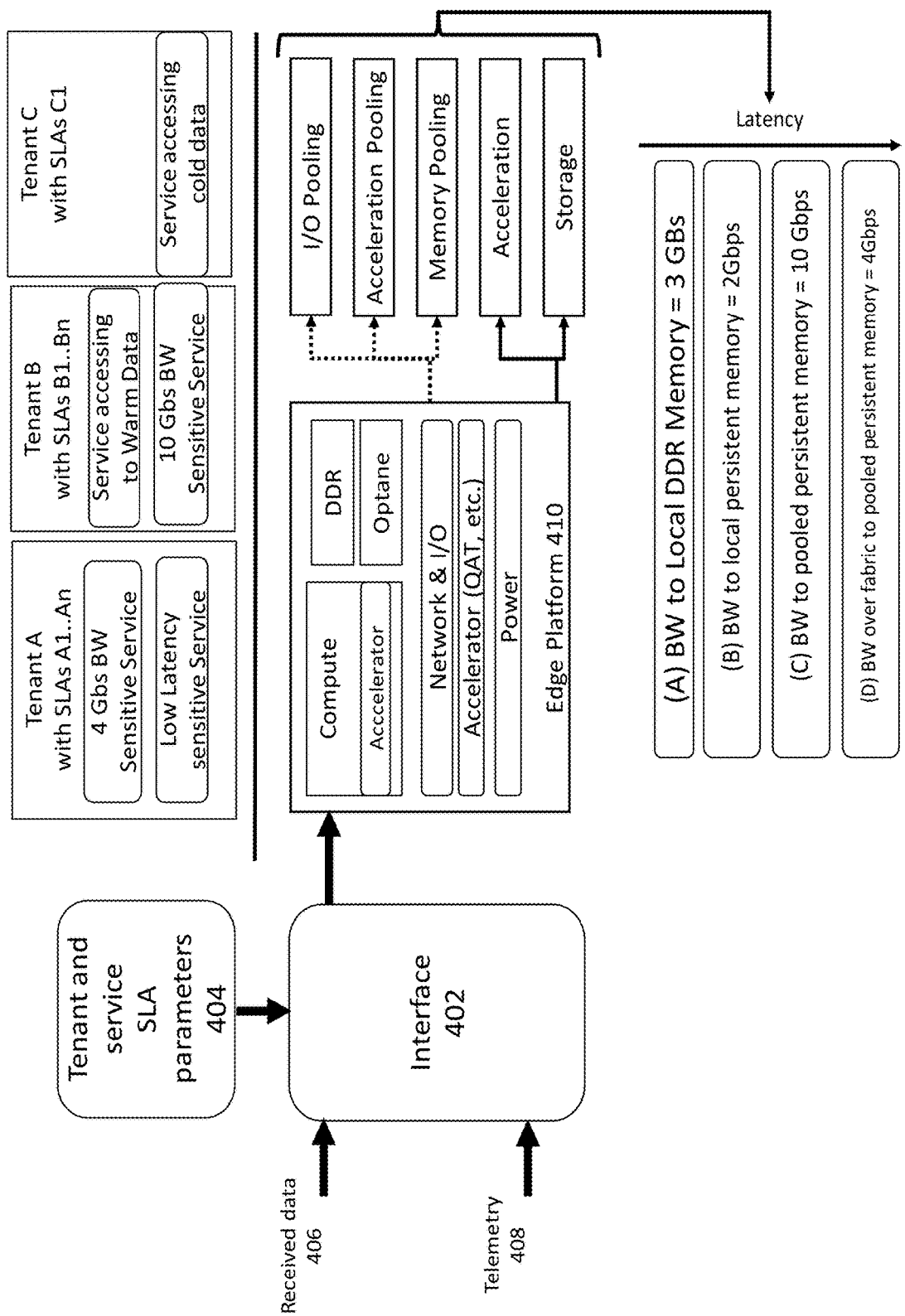
FIG. 4 depicts an example architecture.

FIG. 4 depicts an example architecture. An interface 402 can include programmable circuitry or processors to provide dynamic and adaptive selection of a destination memory device of the platform for input data. Based on tenant and service SLA parameters 404, interface 402 can allow a platform management stack to specify memory priorities and parameters for processes, applications and tenants (represented by a process address ID (PASID)) associated with received payloads. Parameters could be specified per connection sending data to a particular application to actually implement per user or device policies. Interface 402 can be configured to recognize how data will be processed by the current platform (e.g., edge platform, fog platform, data center, or server) and select a memory destination to meet or exceed associated parameters. For example, a service processing the data can accept a latency of N ms and memory bandwidth of 1 Gbps or timing of when data will be accessed or processes (e.g., hot (sooner), warm (relative soon) or cold (not soon)). For example, latency can indicate a time between initiating a request for data in memory and a time when data is accessed by a processor. Memory bandwidth can represent input (storage) rate or output (read) rate for a memory device or tier or class of memory devices and can include acceptable errored rates which can matched to SLA error requirements. Input or output rates can be expressed as average and peak rates. Various embodiments of interface 402 can collect or receive telemetry metrics 408 from one or more memory devices or tiers of the platform to determine which memory device or memory tier can meet the parameters for the payload data. In some examples, interface 402 is part of or accessed by a network interface, fabric interface, memory controller, storage controller, central processing unit, or accelerator device (e.g., encryption/decryption engine).

Various embodiments can use protocols in order to allow different devices to configure interface 402 with fine grain priorities and resource parameters for a payload in received data 406 sent to interface 402. Interface 402 can transfer the payload to a platform for processing or storage. Various embodiments can potentially improve TCO by selecting memory system utilization based on TCO. TCO can include one or more of: resource capacity use cost, amount of money paid for allocation, cost of equipment, power use, power cost, or capital expenditure.

Platform 410 can include compute resources, networking resources, memory, storage and accelerators. For example, platform 410 can include multiple tiers of memory or storage can include one or more of: a cache (e.g., last level cache (LLC), mid-level cache (MLC), level 2 (L2) or level 1 (L1) cache), memory (e.g., DDR compatible memory or HBM compatible memory), persistent memory (e.g., Intel Optane® or Samsung Z-NAND), storage (e.g., NAND or 3D NAND), or 2-level memory (2LM). A memory tier could include the same or different memory technology. A memory tier can be same type of memory device or composite memory devices that exhibit collective latency and memory bandwidth characteristics.

Note that instead of or in addition to use of a cache to store packet data and/or relevant content, various embodiments can use at least two levels of memory ("2LM"). By use of 2LM, data can be moved to near memory when it is closer to being needed for processing data or content. Copying content from far memory to near memory can reduce latency of availability of content. 2LM can include cached subsets of system disk or SSD-level storage (in addition to, for example, run-time data). This main memory can include a first level (alternatively referred to herein as "near memory") including smaller faster memory made of, for example, DRAM or other volatile memory (e.g., cache); and a second level (alternatively referred to herein as "far memory") which includes larger and slower (with respect to the near memory) volatile memory (e.g., DRAM, cache) or nonvolatile memory storage (e.g., flash memory or byte addressable non-volatile memory). The far memory can be presented as "main memory" to the host operating system (OS), while the near memory can act as a cache for the far memory that is transparent to the OS. Management of the two-level memory may be done by a combination of logic and modules executed via the host central processing unit (CPU). Near memory may be coupled to the host system CPU via high bandwidth, low latency interfaces for efficient processing. Far memory may be coupled to the CPU via low bandwidth, high latency interface (as compared to that of the near memory).

A process can represent a device (e.g., accelerator, network interface, or hardware), a processor-executed software, or any combination thereof. A process can include a serverless application or function (e.g., function as a service (FaaS)) that calls another function in a chain of functions. For example, for a serverless application, a cloud service provider dynamically manages allocation and provisioning of servers and a serverless application runs in stateless compute containers that are event-triggered and may last for one invocation. A serverless application can be event-driven, cloud-based application where application development relies on a combination of third-party services, client-side logic and cloud-hosted remote procedure calls. Serverless application can be pay-per-use computing or bare-code where users are charged based on time and computing resources (e.g., CPU, networking, or memory) allocated to run serverless application without associated fees for idle time of computing resources. In some examples, a serverless application or function can be performed by a network infrastructure device (e.g., forwarding element, router, switch, network interface controller) or accelerator, in addition or alternative to use of a server or general purpose computing platform.

A process can refer to an application or a virtualized execution environment. A virtualized execution environment can include at least a virtual machine, process containers, machine containers, or application processes. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an OS or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux® and Windows® Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. Isolation can include access of memory by a particular container but not another container. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

Figure 5:
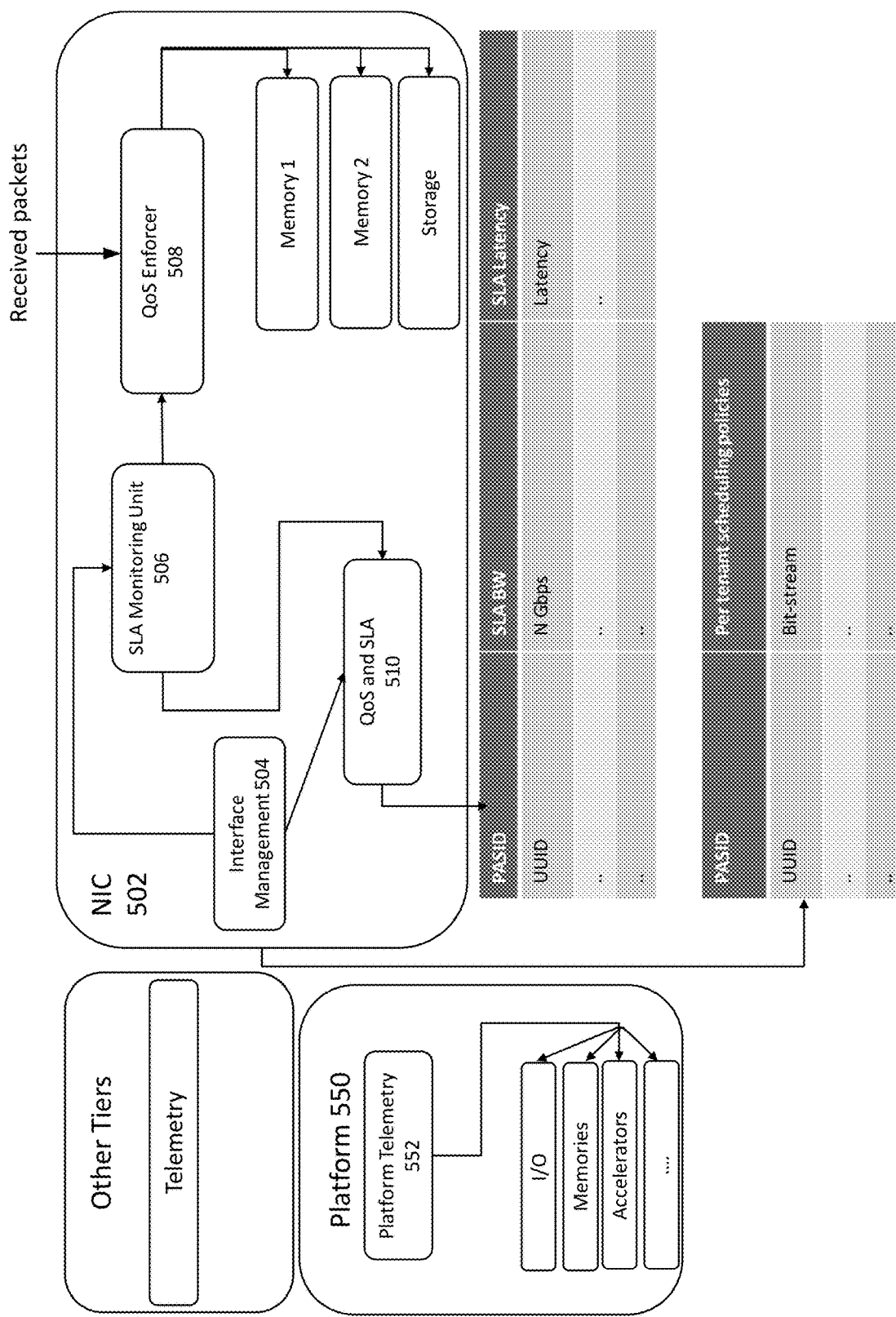
FIG. 5 depicts an example architecture.

FIG. 5 depicts an example architecture. Various embodiments allow for configuration of a network interface (NIC) 502 with fine grain priorities and resource requirements for a payload by providing hints or indications of how a given data will be processed by platform 550 (e.g., edge platform, fog platform, data center, end-point platform or server). By use of one or more hints, network interface 502 can select a specific memory device or memory tier in platform 550 to store received data to satisfy parameters of the hints.

Interface management 504 can receive memory priorities and parameters for processes, applications and tenants. For example, a specific Process Address Space ID (PASID) can represent a process, application or tenant and identify various parameters or hints described earlier for packets or payload received and associated with the PASID. Interface management 504 allows per-connection parameter specification for data sent for access by a particular process executing on platform 550 to configure per-user or per-device policies or parameters. A tenant may have total amount of memory bandwidth target for one or more of the memory tiers. Hence, the policy will consider the budget that data targeting specific services or memory tier the tenant is utilizing. A process or application may have a Service Level Agreement in terms of how much memory or latency to use in order to process the data that devices send. A user or device sending data to particular process or service may have different levels of Service Level Agreement (e.g., in terms of bandwidth or latency).

Interface management 504 can receive hints or parameters from software on platform 550, an orchestrator, tenant that requests work, a device or a user. QoS and SLA 510 can store the hints or parameters for one or more PASID. Hints can include one or more of: latency parameters; memory bandwidth parameters; timing of when the data is expected to be accessed (e.g., data temperature); encryption parameters; security parameters (e.g., secure partitions and cache allocation parameters); or meta-data. Latency parameters can indicate that a service processing the data has a latency of up to M milliseconds. Memory bandwidth parameters can indicate that a service processing the data is to use memory bandwidth of N Gbps. Timing of when the data is expected to be accessed can indicate data is expected to be processed or accessed within P seconds, milliseconds or other parameter. Data that is to be consumed in the further future (e.g., cold data) is more likely to be permitted to be stored in storage whereas data that is to be accessed nearer in time is more likely to be permitted to be stored in cache or memory. For example, sensor data is expected to be accessed within 10 minutes and vehicular technology system (V2X) data is expected to be accessed by an analytic service within 100 ms. Encryption parameters can include application of a specific type or any type of encryption for data stored in memory or storage such as total memory encryption (TME), multi-key total memory encryption (MKTME), or an enclave. Meta-data can include one or more of: service level agreement (SLA) parameters to meet (e.g., TCO), expected memory bandwidth usage, expected packet receive rate, latency sensitivity level, or jitter sensitivity level.

Multiple manners of providing encryption can be used including virtualization, physical partitioning, secure enclaves, Intel® SGX, AMD Memory Encryption Technology, AMD Secure Memory Encryption (SME) and Secure Encrypted Virtualization (SEV), ARM® TrustZone®, Apple Secure Enclave Processor, or Qualcomm® Trusted Execution Environment. A secure enclave can be a region of memory or a processor or both that are not accessible by processes except for designated and limited processes, virtual machines, or containers.

Encryption or decryption can use, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. These technologies can be used to provide a readily comprehensible perspective for understanding the various disclosed embodiments and are not intended to limit implementations to employing only TME and MKTME. TME provides a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key. When enabled via basic I/O system (BIOS) (or Universal Extensible Firmware Interface (UEFI), or a boot loader) configuration, TME can provide for memory accessed by a processor on an external memory bus to be encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system has full visibility into all portions of memory that are configured to not be encrypted by TME. This can be accomplished by reading a configuration register in the processor.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. VMs and containers can be cryptographically isolated from each other in memory with separate encryption keys which can be used in multi-tenant cloud environments. VMs and containers can also be pooled to share an individual key, further extending scale and flexibility.

Hints can be provided to the NIC in one or multiple forms mapped on protocols by a sender of the packets. For example, one or more of the following protocols can be used to convey hints to NIC. ITU-T G.8013/Y.1731 (2015) describes Operations, administration and maintenance (OAM) functions and mechanisms for Ethernet-based networks. OAM could allow measurement and indication of meta-data. In-band OAM for IPv6 feature supports operation, administration, and maintenance (OAM) for IPv6 which allows for recording OAM information in an IPv6 packet during its traversal through a particular network domain.

In some examples, QoS Class Identifier (QCI) levels for packet types can be used to indicate a particular memory device to use. QCI levels can identify packet delay budgets for packets. In some examples, lower packet delay budget traffic or real-time traffic can be stored in cache (e.g., LLC) whereas higher packet delay budget traffic or non-real-time traffic can be stored in memory or even storage. For example, various content (e.g., real time gaming, V2X data, intelligent transport systems, and so forth) are afforded various packet delay budgets. See for example, 3GPP TS 23.203 (2019) provides an example of QCI levels. For an example of application of QCI levels for 5G systems, see for example, 3GPP TS 38.300, v15.3.0, "Policy and charging control architecture" June 2018.

In some examples, packet traffic received over internet protocol (IP) can include a virtual local area network (VLAN) tag. A VLAN tag can be used to indicate one or more hints. See, for example, IEEE 802.1Q-2018. In some example, Generic Network Virtualization Encapsulation (Geneve) can be used as an encapsulation protocol for packets and definable meta data can include one or more hints for use to select a destination memory device. See, for example, IETF Geneve Proposed Standard (2020). An endpoint sender or network router could perform packet inspections or identify various flows and insert tagging or encoding to direct subsequent network elements to handle data placement into memory based upon those tags or provide hints for use to select a destination memory device.

SLA monitoring unit 506 monitors traffic from network interface 502 to determine a rate of data receipt intended for processing by one or more registered PASIDs. SLA monitoring unit 506 can receive telemetry data or device performance indicators. The telemetry data or device performance indicators can be used by SLA monitoring unit 506 to determine current memory bandwidth and current latency for various memory devices or memory tier of platform 550, network interface 502, or other memory or storage. For example, memory bandwidth of a tier and latency for particular tier can be expressed as DDR tier exhibits input bandwidth of 60 Gbps, output bandwidth of 50 Gbps, and latency of 10 ms, and a persistent memory tier exhibits input bandwidth of 30 Gbps, output bandwidth of 30 Gbps, and latency of 20 ms. SLA monitoring unit 506 can collect telemetry metrics of the memory and storage tiers of the platform. For example, SLA monitoring unit 506 can collect memory bandwidth available in one or more tiers and the current latency to access and store data to that tier. Memory bandwidth can be measured in memory bytes/nanosecond or other unit of time or larger or smaller units of time. Latency can be measured in nanoseconds or larger or smaller units of time. In some examples, latency can be measured using methods consistent with RFC 2544 or similar techniques. In some examples, SLA monitoring unit 506 can determine an average or median memory bandwidth and average or median latency over the last N units of time.

For example, QoS enforcer 508 can apply parameter enforcement for a particular tenant, process, or service for any associated bit-stream and cause storage of portions of received packets into a selected memory or storage device. A tenant can have multiple associated bit-streams for which QoS enforcer 508 is to manage selection and storage of received packets. For example, QoS enforcer 508 can use a filter to process received packets and determine if a bit-stream is associated with the received packets. QoS enforcer 508 can utilize performance monitoring of memory or storage devices or tiers from SLA monitoring unit 506, select a destination memory or storage device, and cause storage of data into the selected memory or storage device. For a received packet of a registered bit-stream, QoS enforcer 508 can decide where to store a payload to satisfy associated parameters and store the payload to the corresponding memory or storage tier.

A packet can include a header and payload. A header can be a media access control (MAC) source and destination addresses, EtherType, Internet Protocol (IP) source and destination addresses, IP protocol, Transmission Control Protocol (TCP) port numbers, virtual local area network (VLAN) or Multi-Protocol Label Switching (MPLS) tags. Packet processing can include using Network Function Virtualization (NFV), software-defined networking (SDN), virtualized network function (VNF), Evolved Packet Core (EPC), or 5G network slicing. Some example implementations of NFV are described in European Telecommunications Standards Institute (ETSI) specifications or Open Source NFV Management and Orchestration (MANO) from ETSI's Open Source Mano (OSM) group. VNF can include a service chain or sequence of virtualized tasks executed on generic configurable hardware such as firewalls, domain name system (DNS), caching or network address translation (NAT) and can run in virtual execution environments. VNFs can be linked together as a service chain. In some examples, EPC is a 3GPP-specified core architecture at least for Long Term Evolution (LTE) access. 5G network slicing can provide for multiplexing of virtualized and independent logical networks on the same physical network infrastructure.

However, in some cases, where all parameters cannot be met based on current latency and bandwidth available by memory or storage tiers or the memory or storage that could meet the parameters is full or has no storage capacity to store received data, QoS enforcer 508 can select a subset of tiers that satisfy one or more of: packet parameters in the meta-data, SLA parameters for the service, or tenant requirements for the tenant owning the service. QoS enforcer 508 can select among different potential memory or storage targets to perform load balancing using a round robin scheme. In some examples, QoS enforcer 508 can prioritize meeting memory bandwidth (e.g., input or output) over latency. In some examples, if latency and TCO parameters cannot be met, achieving latency parameter can be prioritized over achieving TCO parameter. In some examples, the SLA can contain a relative priority of satisfying bandwidth, TCO, latency, security requirements, or other parameters and can be used to make a priority decision. However, if data is to be stored securely using a secure memory, then QoS enforcer 508 can drop the data. In some examples, QoS enforcer 508 can divide data for storage into different memory or storage devices across different tiers to provide best efforts for the received data. If future received data for the same bit-stream has available memory or storage devices with accepted parameters, the future received data can be stored in an available memory or storage devices with accepted parameters. In some examples, for received content where parameters cannot be met, QoS enforcer 508 can cause the packet to be stored in a default queue in memory or storage. In some examples, for received content where parameters cannot be met, QoS enforcer 508 can issue an interrupt or other signal to an operating system (OS) to indicate the issue.

For example, if a DDR memory tier provides 20 Gbps input memory bandwidth and 10 ms latency but 40 Gbps input memory bandwidth is specified as a parameter, an interrupt or other message to OS or management software stack can be issued and a resource managers in OS or software stack can reduce bandwidth of other services to allow more bandwidth from the DDR memory tier to be available.

Figure 6:
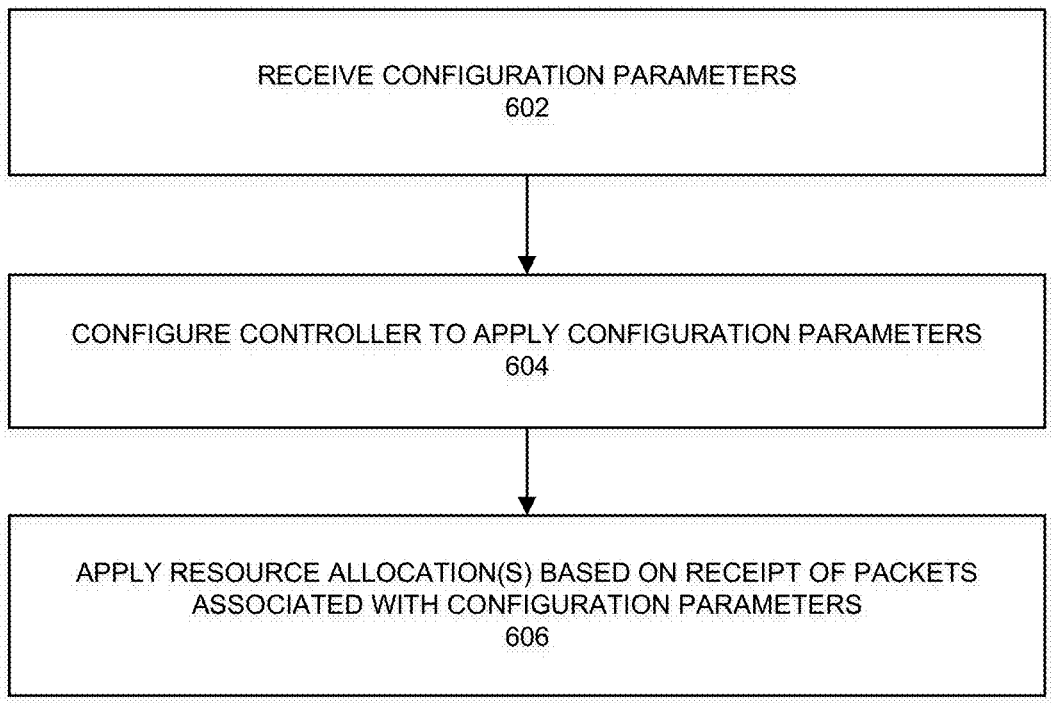
FIG. 6 depicts an example process.

FIG. 6 depicts an example process. The process can be performed by at least one or more of: a network interface, switch, storage controller, fabric interface, accelerator device, memory controller, or central processing unit (CPU). At 602, configuration parameters for packet content can be received. The configuration parameters can include one or more of: data latency; memory bandwidth; timing of when the data is expected to be consumed (e.g., one of multiple levels); encryption requirements for data when stored; or other meta-data. Data latency can indicate a time between initiating a request for data in memory and a time when data is accessed by a processor. Memory bandwidth can represent input (storage) rate or output (read) rate for a memory device or tier or class of memory devices. Timing of when the data is expected to be consumed can indicate data is expected to be processed or accessed within one of various bands of time (e.g., 0-5 ms, more than 5*ms* but less than 10 ms, or 10 ms or more). Encryption requirements can include whether a specific type or any type of encryption for data is required for data storage and access. Meta-data can include one or more of: service level agreement (SLA) parameters to meet (e.g., TCO), expected memory bandwidth usage, expected packet receive rate, latency sensitivity level, or jitter sensitivity level. For example, latency sensitivity can include average packet arrival gaps (e.g., inter-frame gap (IFG) or inter-packet gap (IPG)) or transmission gaps for timing sensitive networking.

At 604, configuration of a controller can take place based on the configuration parameters. For example, a controller can be a device that receives packets from a network or fabric and can be configured to identify packets having associated configuration parameters and select a destination memory or storage device for content from the received packets based on configuration parameters. For example, a network interface can be configured to filter or identify any received packet that has characteristics (e.g., packet header content or packet size) for which configuration parameters are to be applied. For example, for a socket or n-tuple of a packet (e.g., source IP address, destination IP address, protocol source port, protocol destination port, and protocol used) (where n is an integer), a filter can be applied to the received packet so that configuration parameters can be applied to the packet.

At 606, based on receipt of a packet identified to have associated configuration parameters, selection of a destination memory or storage device can take place. For example, a packet can be received with data that is to be stored in a memory or storage device. The memory or storage device can be part of a platform coupled to a network interface that received the packet. A destination memory or storage device can be selected to meet or exceed configuration parameters. In cases where a destination memory or storage device is not available to meet configuration parameters, certain parameters can be prioritized over others. For example, meeting memory bandwidth (e.g., input or output) can be prioritized over meeting latency. In some cases, meeting latency can be prioritized over meeting TCO. However, if data is to be stored securely using encryption but secure memory or encryption is not available for use, the data can be dropped and not stored. In some cases, an indication of not being able to meet configuration parameters is provided to an OS or a tenant.

Conditional Application of Quality of Service

Quality of service (QoS) can be used to represent priority-based fairness in computer systems as allocations of dedicated pathways or slots in shared buffers, queues, etc. QoS can be applied at least for accesses to caches, memory subsystem queues, memory controllers, and fabric cards. In a real-world deployment, in some cases, processes or threads use dedicated QoS bandwidth for specific times or conditions because these processes or threads depend on external events for times when dedicated resources are to be used. In some examples, reserved resources can be released if one or more specified condition is met. For example, if packets associated with a PASID are not received for a certain period of time or the process associated with the PASID is terminated, the resources can be released for other uses.

Figure 7:
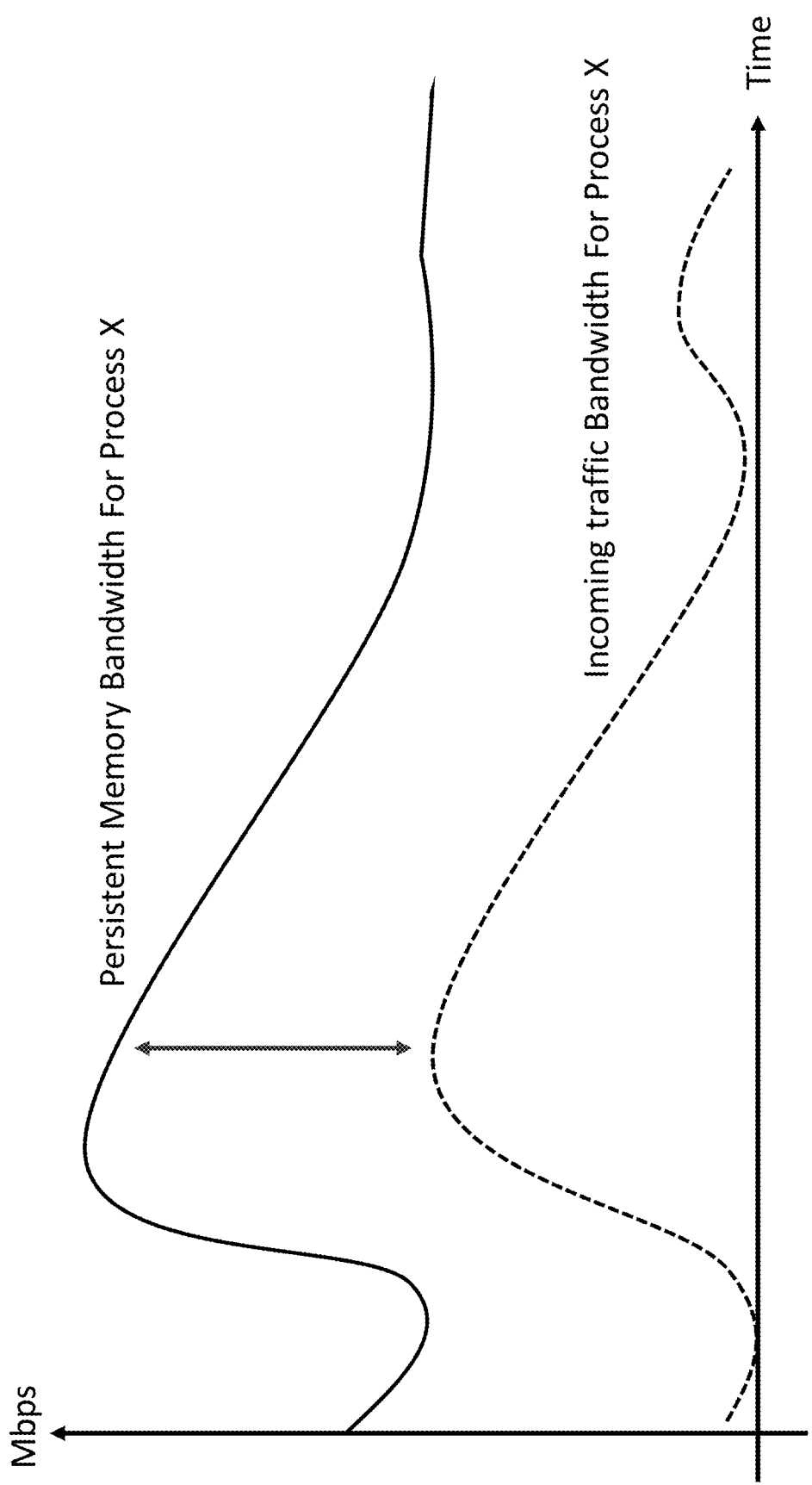
FIG. 7 depicts an example of a correlation of resource utilization for a process with other activity in a system.

FIG. 7 depicts an example of a correlation of resource utilization for a process with other activity in a system. As shown, there is a correlation between data receive rates at the network card and use of memory bandwidth by a process. In this example, process X processes a stream of customer data received from a network card. When this data arrives at the network card, the data is processed with highest priority and added to a database. However, this high priority burst of customer data may arrive once an hour. The remainder of the time, process X is working in the background to add more data from disk, and build some indexes for the same dataset. In this example, the data from the network card is high priority and that arrives only one time an hour for a few minutes. Other examples include video analytics Vehicle-to-vehicle (V2V) or V2X or safety-related information. Within a few microseconds of receiving customer data, process X performs video analytics that may require 10 Gbps memory write bandwidth in order to achieve the SLA for process X. Accordingly, a static QoS and SLA allocation of memory and storage subsystems for process X to have dedicated pathways and queue slots in the system regardless of actual use of those systems could be wasteful, inefficient and starve other processes from use of those resources.

Various embodiments provide conditional QoS for memory and storage devices or tiers where a QoS rule is applied when one or more conditions are met. For example, a process X can receive a burst of network traffic above 1Gb/s one time per hour and when this occurs, a QoS rule is applied to reserve or allocate memory or storage bandwidth for the process X but at other times, memory or storage bandwidth reserved for the process X can be less or best efforts (e.g., no specific reservation of resources).

Figure 8:
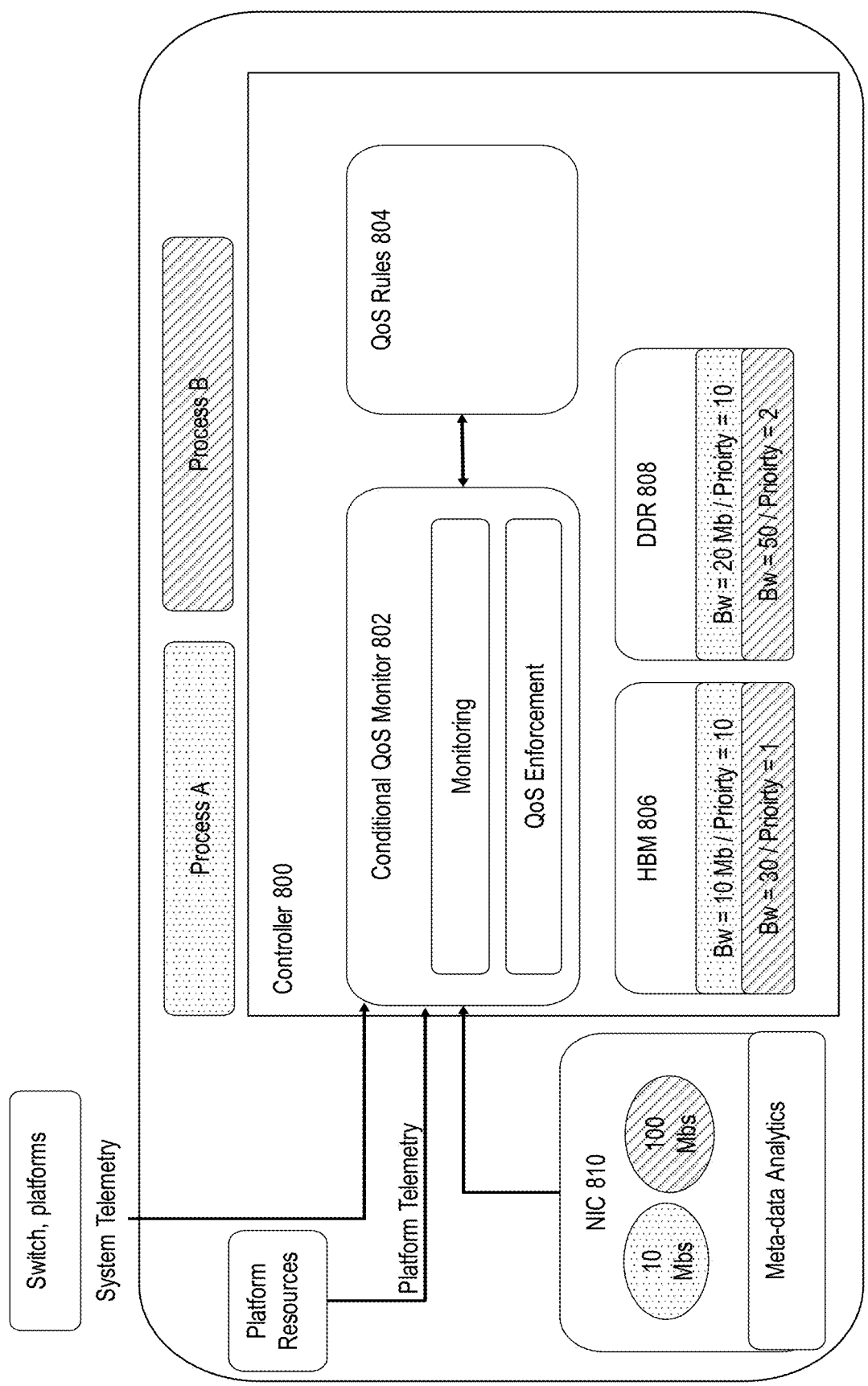
FIG. 8 shows an example overview of conditional parameter application on a system.

FIG. 8 shows an example overview of conditional parameter application on a system. For example, conditional QoS monitor 802 can be used by one or more of: a memory controller, storage controller, an accelerator, a network interface, or a CPU. In this example, a memory or storage controller 800 uses conditional QoS monitor 802 and conditional QoS monitor 802 can be configured with rules 804 that describe QoS (e.g., memory read or write bandwidth to allocate) for a particular resource for a particular process ID (PASID). Conditional QoS monitor 802 receives telemetry from elements of the systems (e.g., network interface card (NIC) 810, platform telemetry, central processing unit (CPU) telemetry, network, fabric, and so forth). Based on telemetry meeting certain criteria, conditional QoS monitor 802 determines whether a rule (among QoS rules 804) is met and when the rule is met, conditional QoS monitor 802 applies QoS parameters for memory resources for a particular process. In some examples, conditional QoS monitor 802 can control memory bandwidth allocated to one or more processes or devices. In this case, multiple rules can be defined in QoS rules 804 for a process or processes in order to identify when a resource reservations for one or more resources is to be changed depending on telemetry data. For example, for a Boolean rule, conditional QoS monitor 802 can configure memory resources for a particular PASID.

An example rule in QoS rules 804 for process B is as follows.
   RULE 0x013
   If PASID[B][NICBW]>50 && 4K Resolution then
      PASID[B][HBM][Bw]=100
      PASID[B][HBM][Prio]=3
      PASID[B][DDR][Bw]=50
      PASID[B][DDR][Prio]=10
In this example, if received bandwidth for a data to be accessed by process B is greater than 50 Mbps and the content is 4K resolution, then High Bandwidth-type memory 806 received bandwidth for the data is set to 100 Mbps with a priority level of 3 and DDR-type memory 808 received bandwidth for the data is set to 50 Mbps with a priority level of 10. Priority level of a rule can be used where multiple rules are satisfied. In such case, a higher priority level rule is selected for applicable.

In this example, NIC 810 is to analyze received or transmitted traffic for process A and process B and provide meta-data that can be used by conditional QoS monitor 802 to determine whether to reserve a resource in HBM-type memory 806 or DDR-type memory 808. Conditional QoS monitor 802 is to apply the specific SLA for the particular resource and PASID when a rule is triggered. If the particular SLA cannot be enforced, conditional QoS logic can generate a software interrupt or other message to a software stack.

For example, rules applied by conditional QoS monitor 802 can be specified using a management interface such as interface management 904 (described later) and provided by a system or kernel software, orchestrator, tenant, a device or a user. The rules can be determined based on machine learning training where telemetry of a system is monitored used to predict memory bandwidth utilization such that observed conditions correlate with memory bandwidth utilization. For example, a rule can correlate a receive data rate at NIC 810 into memory bandwidth allocation for HBM-type memory 806 or DDR-type memory 808.

For example, an SLA associated with an amount of LLC ways for a PASID for process B can depend on the amount of traffic that NIC 810 receives for that particular PASID. Once the conditional telemetry triggers the rule because the received traffic for NIC 810 for process B is above 50 MBps, conditional QoS monitor 802 is called to increase the amount of LLC ways to 3. Similarly, multiple rules for other resources can be triggered by the increase of the traffic to 50 MBps. Hence, multiple resources can be dynamically allocated for process B depending on meeting specific conditions. A rule can be selected for application based on its priority level.

Figure 9:
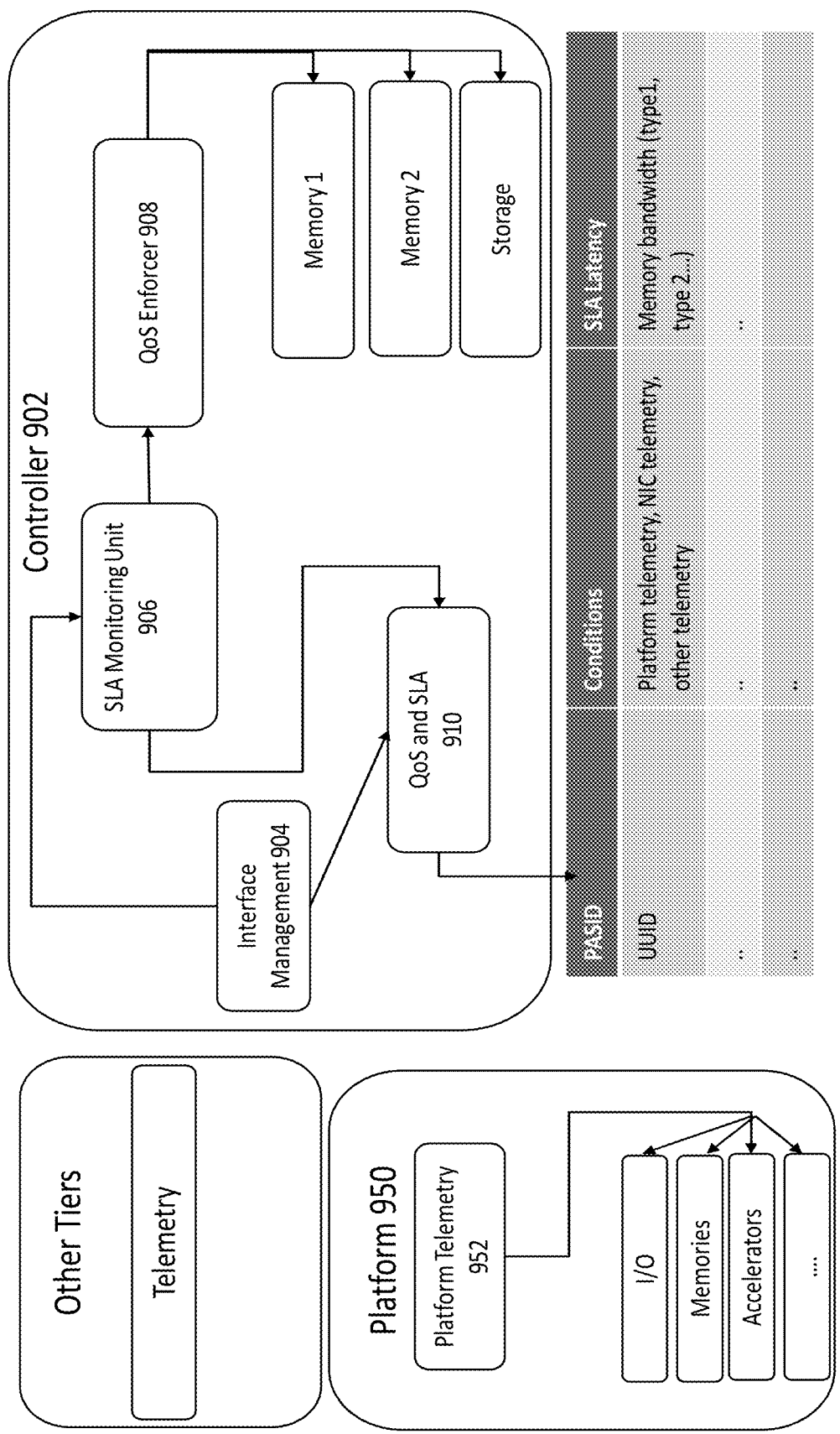
FIG. 9 depicts an example system that can be used to apply conditional resource allocation.

FIG. 9 depicts an example system that can be used to apply conditional resource allocation. In this example, controller 902 can be a memory or storage controller and performs at least data reads from a memory or storage medium or writes to a memory or storage medium. However, controller 902 can be used in any other device (e.g., NIC, CPU) or as a stand-alone device.

Interface management 904 allows conditional resource allocation for use for data received for access by a particular application executing on platform 950 to configure conditional per-user or per-device policies or parameters. Various techniques described with respect to interface management 504 can be used to configure controller 902 but to apply resource allocation for specified conditions. A telemetry rule can be defined by a PASID (process address id) that is associated to the application or service to whom a conditional SLA is attached; an ID for the telemetry rule; a description of the telemetry rule; SLA definition (e.g., resource reservation); or priority for that particular rule. A Boolean expression can be defined using the performance counters and an SLA defined by a particular resource with a particular ID or an amount of that resource is to be allocated to the corresponding PASID when the rule is triggered and selected. Selection of rules can be made based on priority or order of registration.

A rule can be defined by a set of performance counters such as one or more of: cache misses, memory bandwidth utilization, memory size usage, memory allocation, core clock frequency speed, core clock cycle utilization, networking bandwidth used, core idle measurement, core execution of user space processes, core waiting for an input/output operation to complete, cache allocation/utilization, network interface bandwidth (transmit or receive) utilization, CPU cycle utilization, GPU cycle utilization, database transactions/second, collected telemetry, performance monitoring unit (PMU) counters, performance monitoring counters (PMON), performance counter monitor (see, e.g., Willhalm, "Intel® Performance Counter Monitor—A Better Way to Measure CPU Utilization" (2017)), and the like.

SLA monitoring unit 906 receives telemetry data or device performance indicators from various devices (e.g., platform telemetry 952). Telemetry data or device performance indicators can be used by SLA monitoring unit 906 to determine whether any condition has been met. QoS and SLA 910 can store per-process conditions (e.g., rules) and associated resource allocations when the conditions are met. For example, any resource allocation can be used such as but not limited to memory bandwidth, memory latency, encryption, or other parameters described herein.

Based on satisfaction of one or more conditions, QoS enforcer 908 can reserve resources based on the resource allocations specified for a particular tenant or service and cause storage of portions of received packets into a selected memory or storage device. For example, one or more memory devices can have an associated memory latency and based on satisfaction of one or more telemetry conditions, QoS enforcer 908 can reserve memory bandwidth (e.g., input or output) for a memory device that satisfies the associated memory latency. For example, HBM-type memory can have a certain latency parameter whereas DDR-type memory can have another latency parameter.

Note that per-process conditions may also have associated conditions that, when met, indicate when the resources can be released. For example, after a conditional rule is applied based on satisfaction of performance conditions, the conditional rule can be released if other performance conditions are met.

Figure 10:
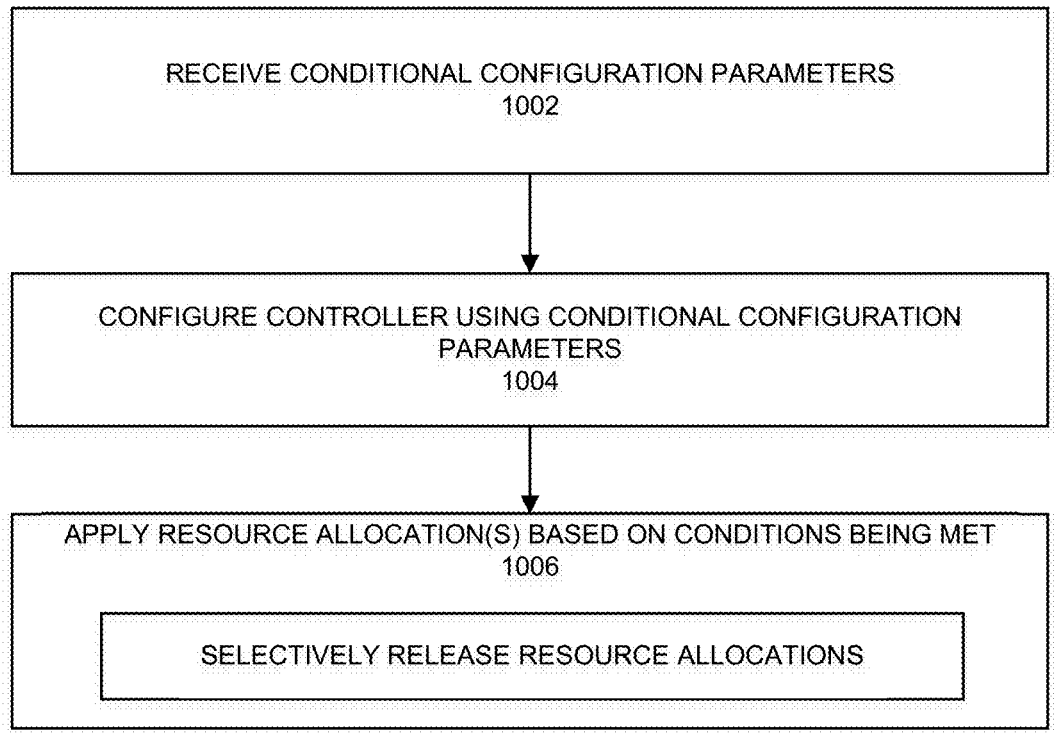
FIG. 10 depicts a process.

FIG. 10 depicts an example process. The process can be performed by at least one or more of: a network interface, switch, storage controller, fabric interface, accelerator device, memory controller, or central processing unit (CPU). At 1002, conditional configuration parameters for content can be received. For example, for a particular process ID, a Boolean expression can be defined for performance counter values and an amount of resources to be allocated when conditions are satisfied. For example, resources parameters to allocate can include one or more of: data latency; memory bandwidth; encryption requirements for data when stored; or other parameters.

At 1004, configuration of a controller using the configuration parameters can take place. For example, a memory controller or storage controller that controls read or write bandwidth available to various memory or storage devices can be configured to apply conditional configuration parameters for memory or storage devices.

At 1006, based on satisfaction of conditions in the configuration parameters, the controller can allocate resources specified in the configuration parameters. A conditional configuration can have an associated priority level such that if multiple conditional configurations are met, a conditional configuration with a higher priority level is selected for use. For example, configuration parameters can cause reservation of memory bandwidth (e.g., input or output) for a memory device that also satisfies the associated memory latency. For example, a specific memory device, type of memory or memory tier can have a certain latency parameter and memory bandwidth is allocated in that specific memory device, type of memory, or memory tier. Accordingly, resource allocation can occur in one or more memory or storage devices at satisfaction of a condition. Note that the condition may also have a trigger that indicates what telemetry is to be measured for the parameters to be released.

Figure 11:
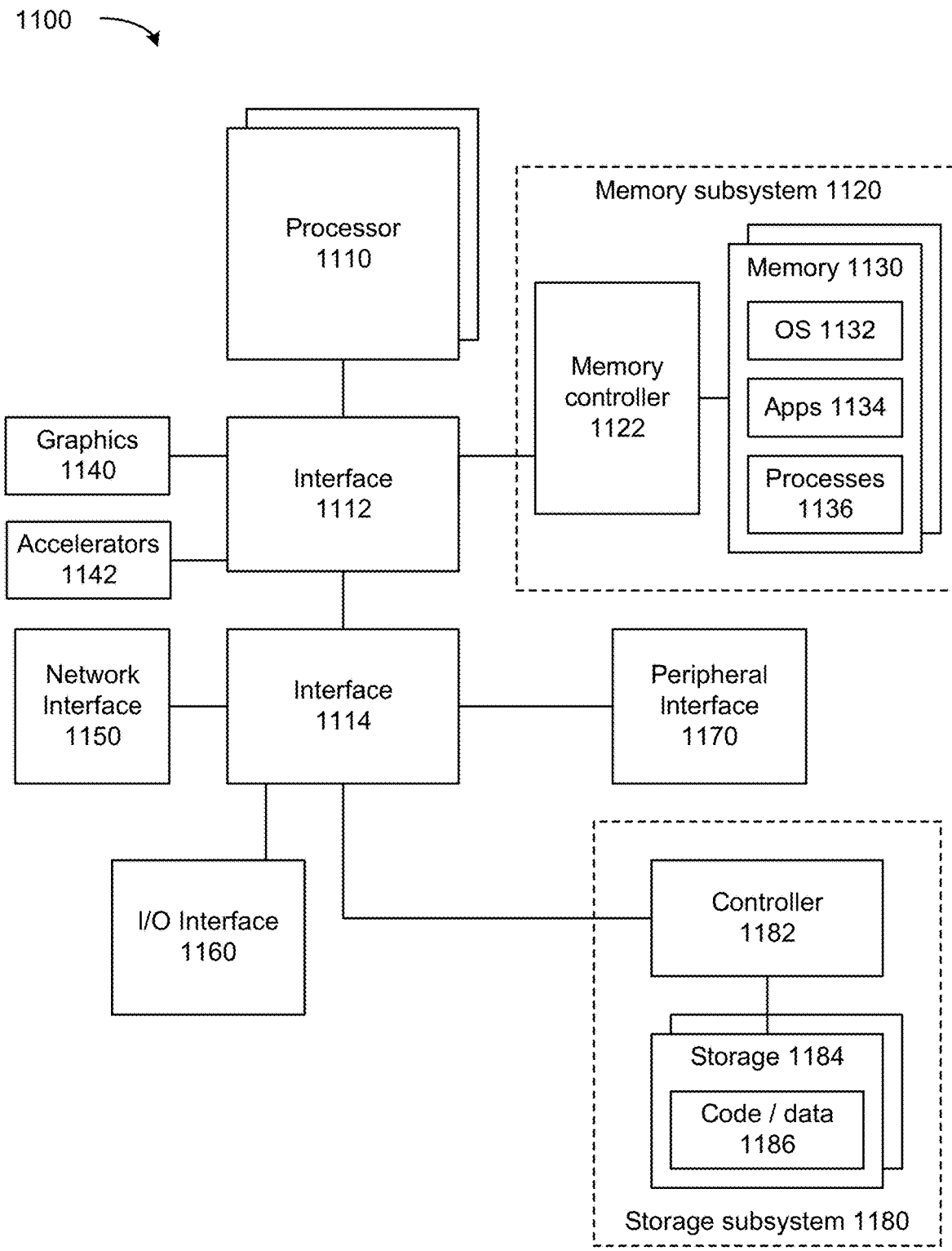
FIG. 11 depicts a system.

FIG. 11 depicts a system. Various embodiments of the system can use embodiments described herein to allocate a packet to a memory tier based on configurations. For example, an accelerator 1142 can include a work scheduler or queue management device that manages memory allocation and/or caches relevant content prior to processing, in accordance with embodiments described herein. System 1100 includes processor 1110, which provides processing, operation management, and execution of instructions for system 1100. Processor 1110 can include any type of microprocessor, central processing unit (CPU), graphics processing unit (GPU), processing core, or other processing hardware to provide processing for system 1100, or a combination of processors. Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1100 includes interface 1112 coupled to processor 1110, which can represent a higher speed interface or a high throughput interface for system components that needs higher bandwidth connections, such as memory subsystem 1120 or graphics interface components 1140, or accelerators 1142. Interface 1112 represents an interface circuit, which can be a standalone component or integrated onto a processor die. Where present, graphics interface 440 interfaces to graphics components for providing a visual display to a user of system 1100. In one example, graphics interface 1140 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Accelerators 1142 can be a programmable or fixed function offload engine that can be accessed or used by a processor 1110. For example, an accelerator among accelerators 1142 can provide compression (DC) capability, cryptography services such as public key encryption (PKE), cipher, hash/authentication capabilities, decryption, or other capabilities or services. In some embodiments, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1142 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory. Network interface 1150 can receive data from a remote device, which can include storing received data into memory. Various embodiments can be used in connection with network interface 1150, processor 1110, and memory subsystem 1120.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (e.g., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (e.g., the value or state of the data is indeterminate if power is interrupted to system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WI02 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 1100. More specifically, power source typically interfaces to one or multiple power supplies in system 1100 to provide power to the components of system 1100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1100 can be implemented using interconnected compute sleds of processors, memories, storages, network interfaces, and other components. High speed interconnects can be used such as compatible at least with Ethernet, PCIe, Intel QuickPath Interconnect (QPI), Intel Ultra Path Interconnect (UPI), Intel On-Chip System Fabric (IOSF), Omnipath, Compute Express Link (CXL), Hyper-Transport, high-speed fabric, NVLink, Advanced Microcontroller Bus Architecture (AMBA) interconnect, OpenCAPI, Gen-Z, CCIX, 3GPP Long Term Evolution (LTE) (4G), 3GPP 5G, and variations thereof. Communications can be compatible with remote direct memory access (RDMA), InfiniBand, Internet Wide Area RDMA Protocol (iWARP), Transmission Control Protocol (TCP), User Datagram Protocol (UDP), quick UDP Internet Connections (QUIC), or RDMA over Converged Ethernet (RoCE). Data and logs can be stored and accessed using virtualized storage nodes using a protocol such as NVMe over Fabrics (NVMe-oF).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 12:
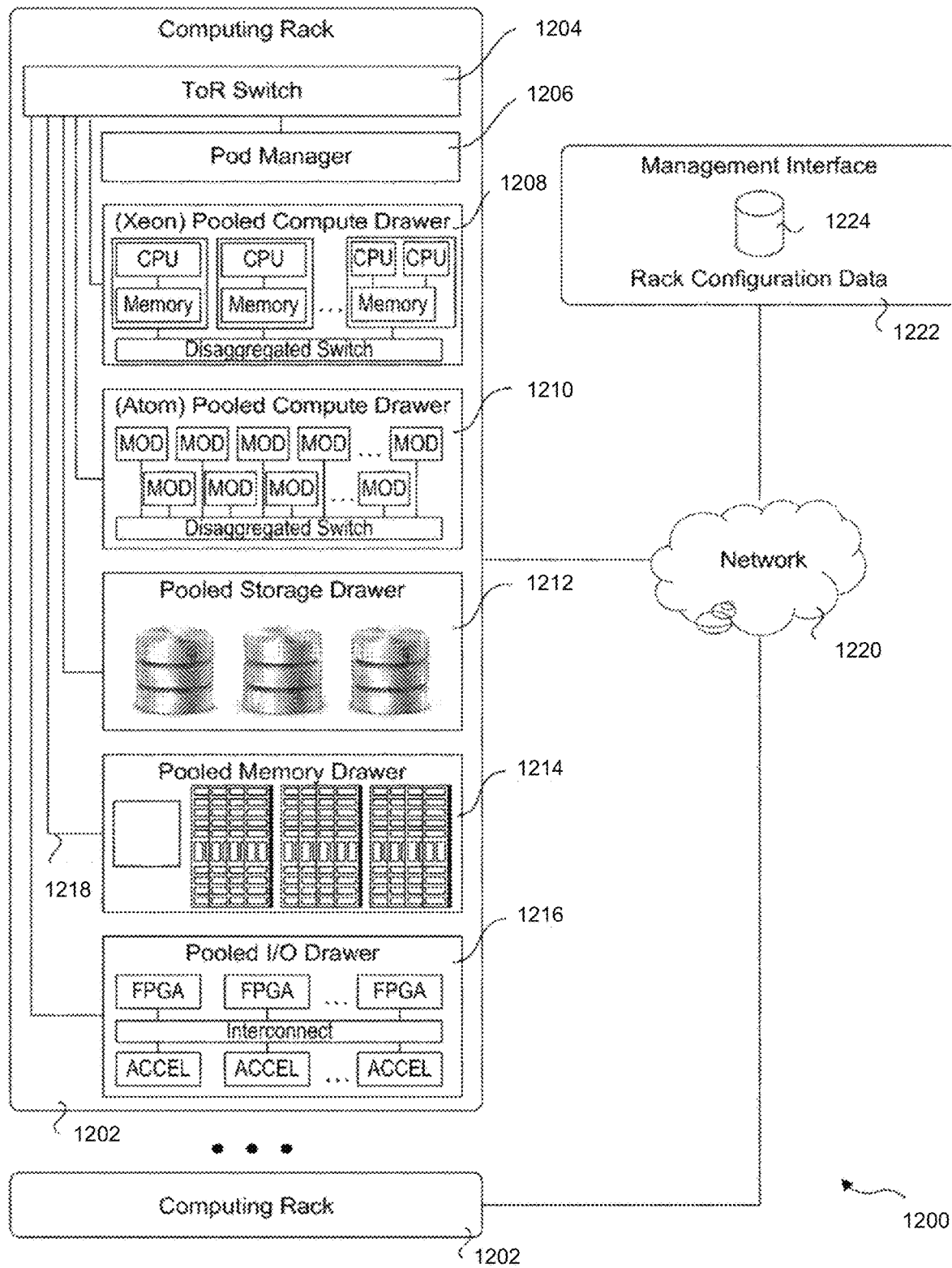
FIG. 12 depicts an environment.

FIG. 12 depicts an environment 1200 includes multiple computing racks 1202, each including a Top of Rack (ToR) switch 1204, a pod manager 1206, and a plurality of pooled system drawers. Various embodiments of the environment can use embodiments described herein to allocate a packet to a memory tier based on configurations. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 1208, and Intel® ATOM™ pooled compute drawer 1210, a pooled storage drawer 1212, a pooled memory drawer 1214, and a pooled I/O drawer 1216. Each of the pooled system drawers is connected to ToR switch 1204 via a high-speed link 1218, such as a 40 Gigabit/second (Gb/s) or 100 Gb/s Ethernet link or a 100+ Gb/s Silicon Photonics (SiPh) optical link. In one embodiment high-speed link 1218 comprises an 800 Gb/s SiPh optical link.

Multiple of the computing racks 1202 may be interconnected via their ToR switches 1204 (e.g., to a pod-level switch or data center switch), as illustrated by connections to a network 1220. In some embodiments, groups of computing racks 1202 are managed as separate pods via pod manager(s) 1206. In one embodiment, a single pod manager is used to manage all of the racks in the pod. Alternatively, distributed pod managers may be used for pod management operations.

Environment 1200 further includes a management interface 1222 that is used to manage various aspects of the environment. This includes managing rack configuration, with corresponding parameters stored as rack configuration data 1224.

Figure 13:
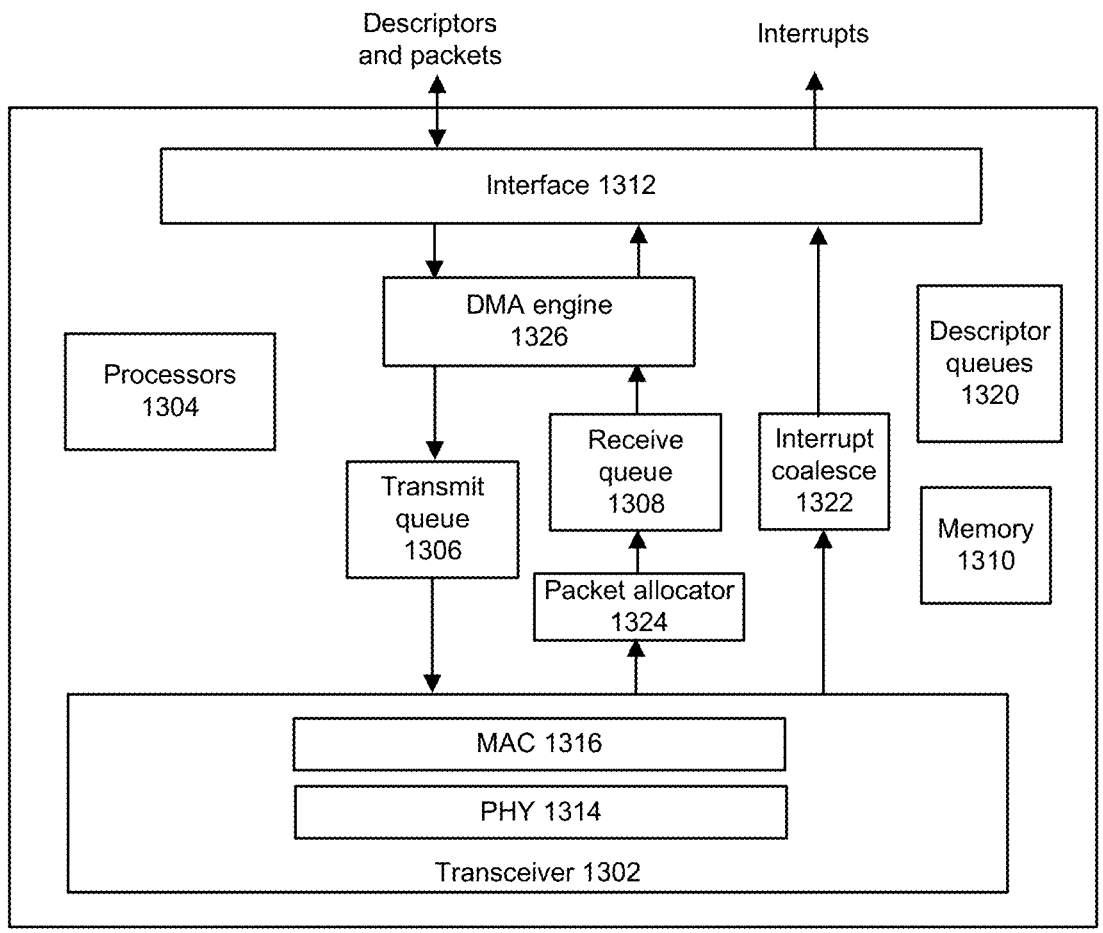
FIG. 13 depicts a network interface.

FIG. 13 depicts a network interface can use embodiments or be used by embodiments. Various embodiments of the network interface can use embodiments described herein to allocate a packet to a memory tier based on configurations. Network interface 1300 can include transceiver 1302, processors 1304, transmit queue 1306, receive queue 1308, memory 1310, and bus interface 1312, and DMA engine 1326. Transceiver 1302 can be capable of receiving and transmitting packets in conformance with the applicable protocols such as Ethernet as described in IEEE 802.3, although other protocols may be used. Transceiver 1302 can receive and transmit packets from and to a network via a network medium (not depicted). Transceiver 1302 can include physical layer (PHY) circuitry 1314 and media access control (MAC) circuitry 1316. PHY circuitry 1314 can include encoding and decoding circuitry (not shown) to encode and decode data packets according to applicable physical layer specifications or standards. MAC circuitry 1316 can be configured to assemble data to be transmitted into packets, that include destination and source addresses along with network control information and error detection hash values. MAC circuitry 1316 can be configured to process MAC headers of received packets by verifying data integrity, removing preambles and padding, and providing packet content for processing by higher layers.

Processors 1304 can be any a combination of a: processor, core, graphics processing unit (GPU), field programmable gate array (FPGA), application specific integrated circuit (ASIC), programmable logic device (PLD) or other programmable hardware device that allow programming of network interface 1300. For example, processors 1304 can provide for allocation or deallocation of intermediate queues. For example, a "smart network interface" (sNIC) can provide packet processing capabilities in the network interface using processors 1304.

Packet allocator 1324 can provide distribution of received packets for processing by multiple CPUs or cores using timeslot allocation described herein or RSS. When packet allocator 1324 uses RSS, packet allocator 1324 can calculate a hash or make another determination based on contents of a received packet to determine which CPU or core is to process a packet.

Interrupt coalesce 1322 can perform interrupt moderation whereby network interface interrupt coalesce 1322 waits for multiple packets to arrive, or for a time-out to expire, before generating an interrupt to host system to process received packet(s). Receive Segment Coalescing (RSC) can be performed by network interface 1300 whereby portions of incoming packets are combined into segments of a packet. Network interface 1300 provides this coalesced packet to an application.

Direct memory access (DMA) engine 1326 can copy a packet header, packet payload, and/or descriptor directly from host memory to the network interface or vice versa, instead of copying the packet to an intermediate buffer at the host and then using another copy operation from the intermediate buffer to the destination buffer.

Memory 1310 can be any type of volatile or non-volatile memory device and can store any queue or instructions used to program network interface 1300. Transmit queue 1306 can include data or references to data for transmission by network interface. Receive queue 1308 can include data or references to data that was received by network interface from a network. Descriptor queues 1320 can include descriptors that reference data or packets in transmit queue 1306 or receive queue 1308. Bus interface 1312 can provide an interface with host device (not depicted). For example, bus interface 1312 can be compatible with peripheral connect Peripheral Component Interconnect (PCI), PCI Express, PCI-x, Serial ATA (SATA), and/or Universal Serial Bus (USB) compatible interface (although other interconnection standards may be used).

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Figure 14:
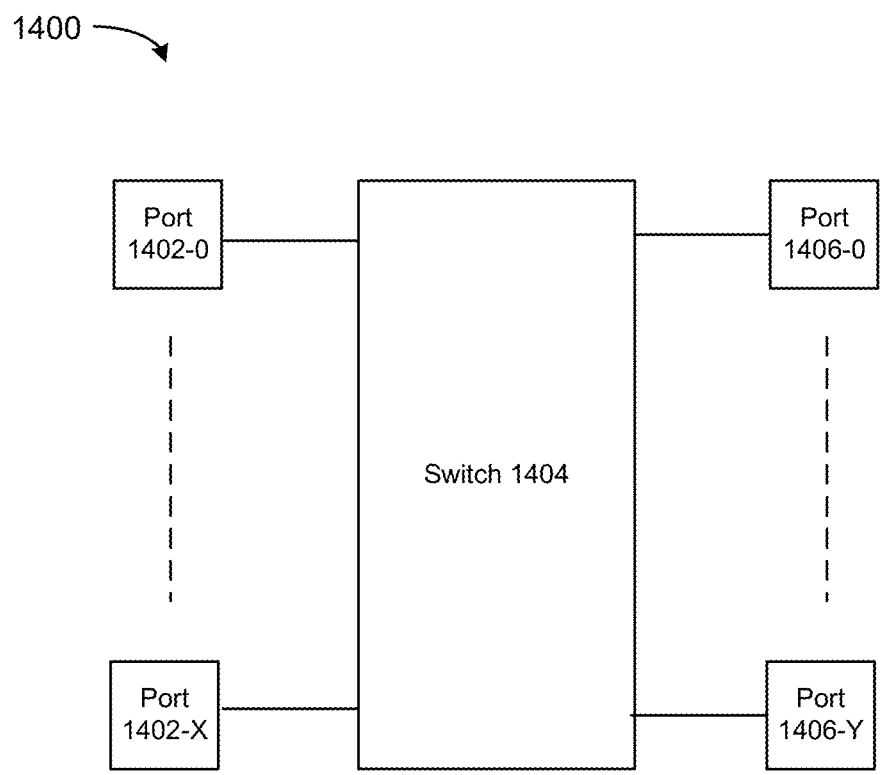
FIG. 14 depicts a switch.

FIG. 14 depicts a switch. Various embodiments of the switch can use embodiments described herein to allocate a packet to a memory tier based on configurations. Switch 1404 can route packets or frames of any format or in accordance with any specification from any port 1402-0 to 1402-X to any of ports 1406-0 to 1406-Y (or vice versa). Any of ports 1402-0 to 1402-X can be connected to a network of one or more interconnected devices. Similarly, any of ports 1406-0 to 1406-X can be connected to a network of one or more interconnected devices. Switch 1404 can decide which port to transfer packets or frames to using a table that maps packet characteristics with an associated output port or match-action units. In addition, switch 1404 can perform packet replication for forwarding of a packet or frame to multiple ports and queuing of packets or frames prior to transfer to an output port.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes a computer-method comprising: at a network interface, selecting a memory device from among multiple memory devices with different bandwidth and latency characteristics and reserving resources in the selected memory device based on a configuration and at the network interface, storing received content in the selected memory device.

Example 2 includes any example, wherein selecting the memory device is based on one or more of: latency, memory bandwidth, timing of when the content is expected to be accessed, or encryption parameters.

Example 3 includes any example, wherein the memory device comprises one or more of: a cache, a volatile memory device, a storage device, or persistent memory.

Example 4 includes any example and includes at the network interface, based on a configuration not being available, performing one or more of: dropping received content, storing the received content in a buffer that does not meet the configuration, or indicating an error.

Example 5 includes any example and includes receiving at the network interface, a configuration to reserve resources in the selected memory device for received content associated with a process identifier, the configuration received from one or more of: an orchestrator, a tenant that requests work, a device, or a user.

Example 6 includes any example and includes receiving at the network interface, a configuration to conditionally reserve memory device resources for received content associated with a process identifier, wherein the conditionally reserve memory device resources comprises reserve memory device resources based on one or more conditions.

Example 7 includes any example, wherein the one or more conditions comprises: a network interface packet receipt bandwidth level.

Example 8 includes any example and includes based on satisfaction of the one or more conditions, reserving memory device resources for received content associated with the process identifier.

Example 9 includes any example and includes de-allocating reserved memory device resources based on satisfaction of a specified condition.

Example 10 includes any example and includes a memory controller performing the reserving and the de-allocating.

Example 11 includes any example and includes an apparatus comprising: a network interface configured to allocate memory resources from among multiple different memory tiers for packets received by the network interface based on configuration settings.

Example 12 includes any example, wherein the configuration settings comprise one or more of: latency, memory bandwidth, timing of when received content is expected to be accessed, or encryption parameters.

Example 13 includes any example, wherein the memory resources comprise one or more of: a cache, a volatile memory device, a storage device, or persistent memory.

Example 14 includes any example, wherein based on a configuration setting not being available, the network interface is to perform one or more of: dropping a received packet, store the received packet in a buffer that does not meet the configuration settings, or indicate an error.

Example 15 includes any example, wherein the network interface is to receive configuration settings to conditionally reserve memory resources, wherein to conditionally reserve memory resources comprises reserve memory device resources based on one or more conditions.

Example 16 includes any example, wherein a memory controller is to conditionally reserve memory resources comprises reserve memory device resources based on one or more conditions.

Example 17 includes any example, wherein the one or more conditions comprises: a network interface packet receipt bandwidth level.

Example 18 includes any example, wherein the network interface is to selectively de-allocate reservation of memory resources based on one or more conditions.

Example 19 includes any example, wherein a memory controller is to selectively de-allocate reservation of memory resources based on one or more conditions.

Example 20 includes any example, and includes one or more of a server, data center, memory resources, or accelerator device.

What is claimed is:

1. A computer-implemented method comprising:
a network interface:
selecting a memory device from among multiple memory devices with different bandwidth and latency characteristics;
based on a first level of packet receipt at the network interface and a configuration, reserving resources in the selected memory device for a particular application;
storing received content in the selected memory device for the particular application;
based on a second level of packet receipt, releasing the reservation of the resources in the selected memory device; and
based on a termination of the particular application, releasing the reservation of the resources in the selected memory device.

2. The method of claim 1, wherein the selecting the memory device from among multiple memory devices with different bandwidth and latency characteristics is based on one or more of: latency, memory bandwidth, timing of when the content is expected to be accessed, or encryption parameters.

3. The method of claim 1, wherein the memory device comprises one or more of: a cache, a volatile memory device, a storage device, or persistent memory.

4. The method of claim 1, comprising:
at the network interface, based on the configuration not being met by one or more of the multiple memory devices, performing one or more of: dropping received content, storing the received content in a buffer that does not meet the configuration, or indicating an error.

5. The method of claim 1, comprising:
receiving, at the network interface, the configuration to reserve resources in the selected memory device for received content associated with a process identifier, the configuration received from one or more of: an orchestrator, a tenant that requests work, a device, or a user.

6. The method of claim 1, comprising a memory controller performing the reserving and the releasing de allocating.

7. The method of claim 1, wherein the second level of packet receipt is less than the first level of packet receipt.

8. The method of claim 1, wherein the particular application is to execute on multiple nodes.

9. The method of claim 1, wherein the network interface comprises a direct memory access (DMA) circuitry, host interface, and a network interface.

10. An apparatus comprising:
a network interface comprising:
a direct memory access (DMA) circuitry;
a network interface;
a host interface; and
circuitry configured to:
based on a first packet receipt level at the network interface and configuration settings, allocate memory resources from among multiple different memory tiers for a particular process for contents of packets received by the network interface;
store the received contents in the allocated memory resources for the particular process;
based on a second level of packet receipt, release the allocation of memory resources; and
based on a termination of the particular process, release the allocation of memory resources.

11. The apparatus of claim 10, wherein the configuration settings comprise one or more of: latency, memory bandwidth, timing of when the received contents is expected to be accessed, or encryption parameters.

12. The apparatus of claim 10, wherein the memory resources comprise one or more of: a cache, a volatile memory device, a storage device, or persistent memory.

13. The apparatus of claim 10, wherein based on the configuration settings not being met by one or more of the multiple different memory tiers, the network interface is to perform one or more of: drop a received packet, store the received packet in a buffer that does not meet the configuration settings, or indicate an error.

14. The apparatus of claim 10, comprising a memory controller to release the allocation of memory resources.

15. The apparatus of claim 10, comprising one or more of a server, data center, memory resources, or accelerator device, wherein the server, data center, memory resources, or accelerator device are coupled to the network interface.

16. The apparatus of claim 10, wherein the second level of packet receipt is less than the first level of packet receipt.

17. The apparatus of claim 10, wherein the particular process is to execute on multiple nodes.

* * * * *

UNITED STATES PATENT AND TRADEMARK OFFICE
CERTIFICATE OF CORRECTION

PATENT NO. : 12,160,368 B2
APPLICATION NO. : 16/859792
DATED : December 3, 2024
INVENTOR(S) : Francesc Guim Bernat et al.

Page 1 of 1

It is certified that error appears in the above-identified patent and that said Letters Patent is hereby corrected as shown below:

In the Claims

Claim 6:
"The method of claim 1, comprising a memory controller performing the reserving and the releasing de allocating."
Should read:
The method of claim 1, comprising a memory controller performing the reserving and the releasing.

Signed and Sealed this
Eleventh Day of February, 2025

Coke Morgan Stewart
*Acting Director of the United States Patent and Trademark Office*